Jan. 17, 1956     M. H. RIPPLE     2,730,901
FOOD MIXERS

Filed March 18, 1953     3 Sheets-Sheet 1

INVENTOR.
Melvin H. Ripple
BY
ATTORNEY.

Jan. 17, 1956  M. H. RIPPLE  2,730,901
FOOD MIXERS

Filed March 18, 1953  3 Sheets-Sheet 2

INVENTOR.
Melvin H. Ripple
BY
ATTORNEY.

INVENTOR.
Melvin H. Ripple
BY
ATTORNEY.

United States Patent Office 2,730,901
Patented Jan. 17, 1956

2,730,901

FOOD MIXERS

Melvin H. Ripple, Canton, Ohio, assignor to The Hoover Company, North Canton, Ohio, a corporation of Ohio Application March 18, 1953, Serial No. 343,121

15 Claims. (Cl. 74—16)

The present invention relates to food mixers and more particularly to a power stand therefor which normally supports the power unit in an elevated position overhanging a mixing bowl mounted on the base of the stand and having a gear unit detachably mounted within a hollow pedestal of the stand whereby the device may be used to drive a plurality of different power driven kitchen utensils or appliances.

For normal mixing purposes the power unit is supported on the top of the pedestal and the base of the stand is made flat for supporting a mixing bowl. For storage purposes the power unit is supported on the base in order to reduce the height of the mixer. When the device is used for driving other power driven utensils or appliances, the power unit is also supported on the base and has a power take-off connection detachably connected to a power receiving connection in the front of the pedestal.

The mixer of the present invention is designed to be sold with or without the gearing arrangement for driving other power driven kitchen utensiles. For that purpose the gear unit is made readily removable from the standard. The mixer is sold to those persons who do not wish to use additional utensils or appliances, without the gear unit and to those who wish to use additional appliances, with the gear unit assembled.

According to the present invention the gear unit is removably mounted in the hollow pedestal of the stand by means of a removable cover plate for the front of the pedestal. The power unit has a power take-off connection in its front end directly connected to the motor shaft, which cooperates with a forwardly facing power receiving connection in the gear unit, the latter connection extending through an opening in the removable front plate of the pedestal, so that it may be detachably connected to the power take-off of the motor when the power unit is supported on the base.

The gear unit has a power take-off connection on a rear end of a horizontally extending shaft accessible from the rear of the pedestal for detachable connection with the power shaft of a high speed blender or other high speed appliance. For driving the blender at high speed the power take-off at the rear of the pedestal is directly connected to the motor shaft through the detachable connection at the front of the pedestal.

The gear unit is also provided with a vertically extending shaft geared to the horizontally extending shaft through a reduction gearing and a second horizontally extending shaft geared to the vertically extending shaft through a second reduction gearing. The vertically extending shaft has a power take-off connection accessible through the top wall of the pedestal and the second horizontally extending shaft has a power take-off connection accessible through one side wall of the pedestal.

Thus the three power take-off connections of the gear unit are driven at different speeds, the one accessible at the rear of the pedestal being driven at a high speed for driving a blender or other high speed appliance, the one accessible at the top of the pedestal being driven at an intermediate speed for driving a fruit juicer or other moderate speed utensil or appliance, and the one accessible from the side of the pedestal being driven at a comparatively slow speed for driving a can opener, a meat grinder, a vegetable slicer or other slow speed appliance.

As will appear hereinafter, each of the power take-off connections may be used simultaneously if desired. For example, while the blender is being used a juicer may be used to provide juice for the blending operation and a vegetable slicer or grinder may be used to provide the desired vegetable for blending purposes.

Other objects and advantages of the present invention will become apparent as the description proceeds when taken in connection with the accompanying drawings in which.

Figure 1:
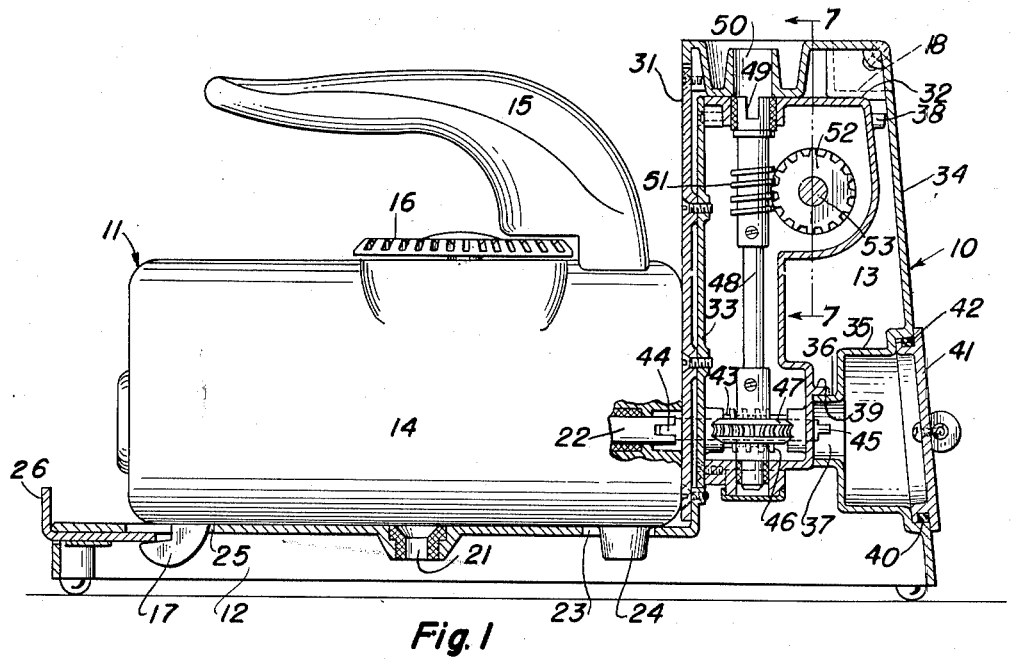
Figure 1 is a vertical cross sectional view of the power stand of the present invention showing the removable gear unit installed and a power unit mounted on the base in driving relationship with the gear unit.
Figure 2:
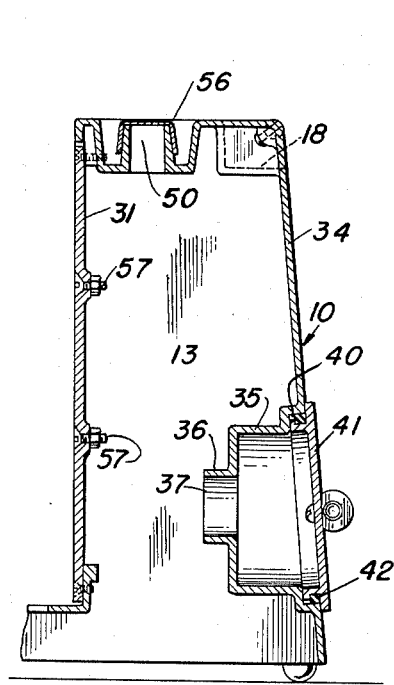
Figure 2 is a vertical cross sectional view of the pedestal of the power stand of Fig. 1 showing the pedestal with the gear unit removed.

Referring to the drawing the power stand of the present invention is generally represented by the reference numeral 10 and the power unit by the reference numeral 11. The power stand 10 includes a flat base portion 12 and a pedestal 13 rising from one end thereof. The power unit 11 comprises a motor casing 14, a carrying handle 15 and a control dial 16 for controlling the operation of the power unit including a speed control of any well known construction.

Figure 5:
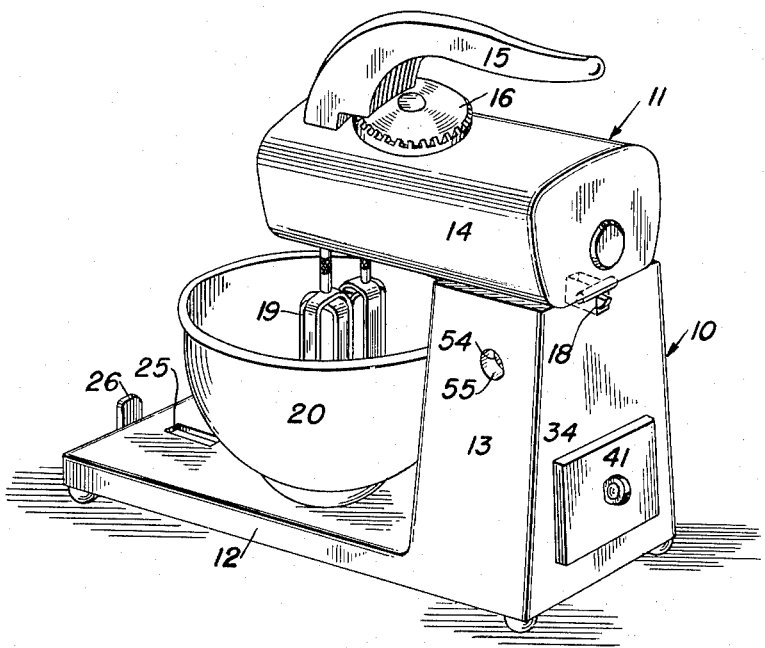
Figure 5 is a perspective view of the mixer of the present invention showing the device in position for ordinary mixing purposes.

At its rear end the motor casing 14 is provided with a supporting lug 17, which for ordinary mixing operations, cooperates with a reentrant recess 18 in the top of the pedestal 13 for supporting the power unit 11 in a horizontal position overhanging the base 12 as shown in Fig. 5. The motor of the power unit 11 is geared to a pair of mixers 19 which extend downwardly from the front of the power unit 11 into a mixing bowl 20 rotatably supported on the base 12 by means of a bearing 21.

At its front end the power unit 11 is provided with a power take-off connection 22 which is preferably directly connected to the motor shaft while the mixers 19 are connected to the motor shaft by suitable reduction gearing as is well known in the art.

For storage purposes the power unit 11 is supported on the base 12 in the position shown in Fig. 1, the casing 14 being provided with a flat base for that purpose. The base 12 is provided with an opening 23 for receiving the lugs 24 surrounding the power take-off connections for the mixers 19 and with an opening 25 for receiving the supporting lug 17 extending downwardly from the casing. A slidable latch 26 is provided for engaging the lug 17 for clamping the power unit 11 to the base 12.

Figure 3:
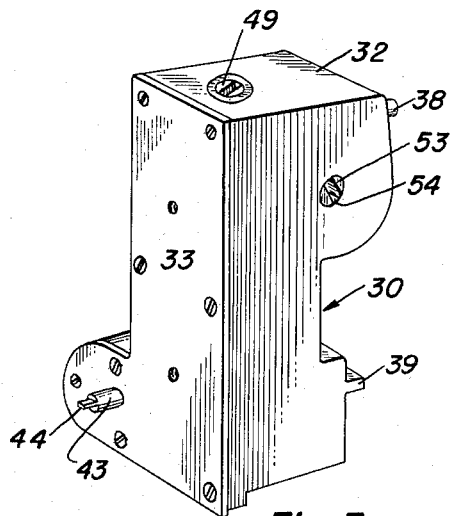
Figure 3 is a perspective view of the gear unit of the present invention removed from the pedestal.
Figure 7:
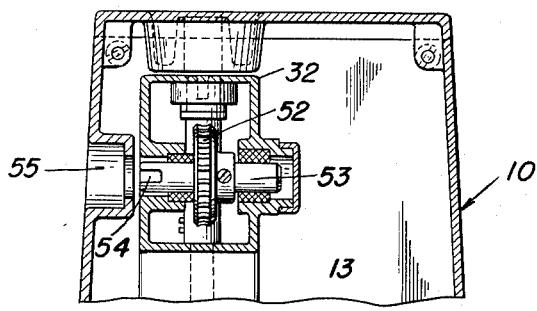
Figure 7 is a detailed cross sectional view of the gearing arrangement taken in line 7—7 of Fig. 1.
Figure 8:
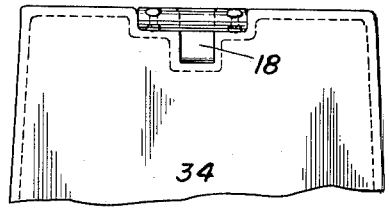
Figure 8 is a detailed view of the supporting connection between the power stand and the top of the pedestal.
Figure 4:
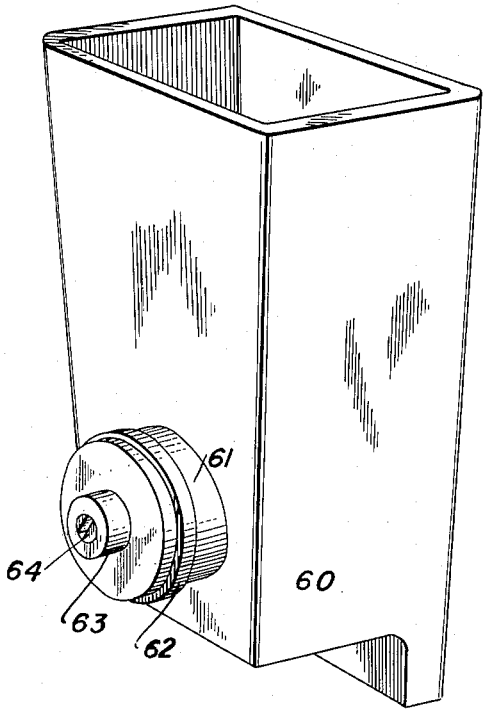
Figure 4 is a perspective view of a blender unit adapted for use with the power stand of Fig. 1 showing how the blender is to be attached to the power stand.

The pedestal 13 is of hollow construction and is adapted to detachably receive the gear unit of Fig. 3 generally indicated by the reference numeral 30. For that purpose the pedestal 13 is provided with a removable front wall 31 held in place by screws as shown.

The gear unit 30 includes a casing 32 having a front wall 33 adapted to be detachably connected to the front wall 31 of pedestal 13 by screws as shown. The rear wall 34 of pedestal 13 is formed with an inwardly extending annular protuberance 35 having a smaller annular projection 36 forming an opening 37 for a purpose which will later appear.

Extending rearwardly from the upper end of casing 32 are a pair of positioning lugs 38 for contact with the rear wall 34 of pedestal 13. At its lower end the gear casing 32 is formed with a rearwardly extending positioning lug 39 for engagement with the upper side of extension 36 of pedestal 13. The casing 32 is attached to the removable front wall 31 of pedestal 13 by screws as shown. The assembly thus formed is then inserted into the cavity of the pedestal 13 with the lugs 38 engaging the rear wall 34 and the lug 39 overlying extension 36. The cover plate 31 is then secured to the pedestal 13 by screws as shown.

The inwardly extending protuberance 35 forms an annular opening 40 in the rear wall 34 of pedestal 13, which may be closed by a closure plate 41 which is held within the opening 40 by an annular resilient member 42.

The removable gear unit 30 includes a horizontally extending rotatably mounted shaft 43 extending through an opening in the front wall 31 of pedestal 13 and having a power receiving connection 44 for detachable driving engagement with the power take-off 22 of the power unit 11 as shown in Fig. 1. The rear end of shaft 43 is provided with a power take-off connection 45 extending into the opening 37 of the extension 36 for a purpose which will presently appear.

The shaft 43 carries a worm 46 meshed with a worm gear 47 carried by a vertically extending shaft 48 rotatably mounted within the casing 32. The upper end of shaft 48 is provided with a power take-off connection 49 accessible through an opening 50 in the top wall of the pedestal 13.

The shaft 48 carries a worm 51 meshed with a worm gear 52 carried by a horizontally extending shaft 53 rotatably mounted within the casing 32. The shaft 53 is provided with a power take-off connection 54 accessible through an opening 55 in one of the side walls of the pedestal 13.

When it is desired to sell the mixer without the provision for driving other power driven appliances the gear unit 30 is not assembled into the standard 13. In that case the opening 40 is closed by cover plate 41, the opening 50 is closed by a cap 56 and the screw openings in the front wall 31 of the pedestal 13 are closed by bolts 57. The cover plate 41 and cap 56 are also used when the power take-offs 45 and 49 are not in use.

A blender unit 60 is adapted to be detachably secured within opening 40 when the cover plate 41 is removed. For that purpose the blender unit is provided with a protuberance 61 adapted to enter the opening 40 and with an annular resilient member 62 for frictionally supporting the blender 60 against the rear wall 34 of pedestal 13. The protuberance 61 has an extension 63 which enters the opening 37 and is provided with a power receiving connection 64 connected to the driving shaft of the blender 60 for detachable driving engagement with the power take-off connection 45.

Figure 6:
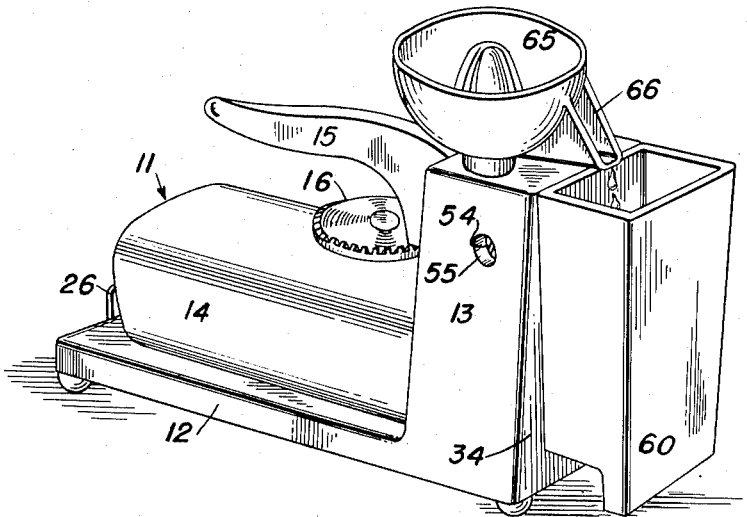
Figure 6 is a perspective view of the power stand of Fig. 1 showing how the device is used for the simultaneous operation of a blender and juicer.

The power take-off connection 49 is adapted to be detachably and drivingly connected to the drive shaft of a power driven kitchen utensil 65 which may be a fruit juicer as shown in Fig. 6. The power take-off connection 54 is adapted to be detachably and drivingly connected to the drive shaft of another power driven kitchen utensil or appliance which may be a meat or vegetable grinder, a can opener, a vegetable slicer or other such appliance.

As shown in Fig. 6 the blender 60 and juicer 65 are in simultaneous operation, the juicer 65 having a spout 66 for dispensing fruit juice into the blender 60. The vegetable slicer or grinder may also be simultaneously operated from the power take-off 54 to provide the proper vegetable to be added to the mixture in the blender 60.

The power take-off 45 is driven at high speed, being directly connected to the motor shaft. The power take-off 49 is driven at an intermediate speed being driven by the worm and gear drive 46—47 from the shaft 43. The power take-off 54 is driven at a slow speed being driven from the shaft 48 by the worm and gear connection 51—52. Thus sufficient power take-off connections are provided for driving any kitchen utensil or appliance at the proper speed, which speed can be additionally varied by the adjustment of the control dial 16.

From the foregoing it can be seen that the present invention provides a food mixer well adapted for ordinary mixing purposes in which the total height of the mixer can be materially reduced for storage purposes, in which the mixer is readily adaptable for use in driving other power driven appliances at the proper speeds for the purpose desired and in which a plurality of different appliances may be driven simultaneously in performing a particular culinary operation.

While I have shown and described but a single embodiment of my invention it is to be understood that that embodiment is to be taken as illustrative only and not in a limiting sense. I do not wish to be limited to the particular structure shown and described, but wish to include all equivalent variations thereof except as limited by the scope of the claims.

I claim:

1. A portable power stand for a food mixer comprising; a flat base upon which the stand may be supported; a hollow pedestal extending upwardly from said base at one end thereof; and a gear unit detachably secured within said hollow pedestal; said gear unit including a casing, a first horizontal shaft rotatably mounted within said casing and accessible through the front and rear walls of said pedestal, a vertical shaft rotatably mounted within said casing, said vertical shaft being geared to said first horizontal shaft and its upper end being accessible through the top wall of said pedestal and a second horizontal shaft rotatably mounted in said casing, said second horizontal shaft being geared to said vertical shaft and having one of its ends accessible through one side wall of said pedestal; the ends of said shafts which are accessible through the walls of said pedestal being formed with power take-off connections for detachable driving connection with the drive shafts of power driven appliances.

2. A power stand according to claim 1 in which said base is formed to support a power unit having a power take-off connection for detachable driving engagement with the end of said first horizontal shaft accessible through the front wall of said pedestal.

3. A power stand according to claim 1 in which said pedestal is provided with a removable front wall and said gear casing is detachably secured to said removable front wall.

4. A power stand according to claim 1 in which the gearing between said vertical and horizontal shafts are reduction gearings whereby said power take-off connections are driven at three different speeds.

5. A power stand for a food mixer comprising, a base upon which said stand may be supported, a power unit supported on said base, said power unit having a forwardly facing power take-off connection, a hollow pedestal extending upwardly from said base in front of the power take-off connection of said power unit and a gear unit removably mounted within said hollow pedestal, said gear unit having a power receiving connection detachably connected with the power take-off connection of said power unit and at least one power take-off connection accessible through one wall of said pedestal for detachable driving engagement with the drive shaft of a removable power driven appliance.

6. A power stand according to claim 5 in which the power take-off connection of said power unit is directly connected to the motor of said power unit and the power take-off connection of said gear unit is directly connected to the power take-off connection of said power unit.

7. A power stand according to claim 5 in which said pedestal is provided with a removable front closure plate and said gear unit is detachably connected to said closure plate.

8. A power stand according to claim 5 in which said gear unit is provided with three power take-off connections accessible through the walls of said pedestal, one of said power take-off connections being directly connected to the power take-off connection of said power unit, a second of said power take-off connections being geared to the power take-off connection of said power unit so as to be rotated at an intermediate speed and the third of said power take-off connections being geared to the power take-off connection of said power unit so as to rotate at a slow speed.

9. A power stand according to claim 5 in which one wall of said pedestal is formed with an inwardly extending protuberance forming an outwardly opening hollow cavity, in which said gear unit has a power take-off connection accessible from the interior of said cavity and a power driven appliance having a protuberance detachably mounted within said cavity with a drive shaft drivingly connected to said power take-off connection.

10. In a power stand for a food mixer having a hollow pedestal, a gear unit adapted to be detachably supported within said hollow pedestal, said gear unit including a casing, a power receiving connection accessible through the front wall of said casing, a first power take-off connection directly connected to said power receiving connection and accessible from the rear wall of said casing, a second power take-off connection geared to said power receiving connection to rotate at an intermediate speed and being accessible from the top of said casing and a third power take-off connection geared to said power receiving connection to rotate at a slow speed and being accessible from a side wall of said casing.

11. A gear unit according to claim 10 in which said casing is provided with positioning lugs engageable with the walls of said hollow pedestal to position the gear unit in the proper position within said hollow pedestal.

12. A gear unit adapted to be detachably supported within the hollow pedestal of a power stand for a food mixer comprising; a casing, said casing having front and rear walls, side walls and a top wall; a first shaft rotatably mounted within said casing and extending horizontally from the front to the rear walls of said casing; said first shaft being provided with a power receiving connection accessible through the front wall of said casing and with a power take-off connection accessible through the rear wall of said casing; a second shaft mounted for rotation within said casing for rotation on a vertical axis and being geared to said first shaft by a reduction gearing; said second shaft having a power take-off connection accessible through the top wall of said casing and a third shaft mounted for rotation within said casing on a horizontal axis and being geared to said second shaft by a reduction gearing; said third shaft having a power take-off connection accessible through a side wall of said casing.

13. A gear unit according to claim 12 in which said casing is provided with positioning lugs for engaging the walls of the hollow pedestal for properly positioning the gear unit within the hollow pedestal.

14. A power stand for a food mixer comprising, a flat base upon which said stand may be supported, the upper surface of said base being formed to support a power unit, a hollow pedestal extending upwardly from one end of said base, said pedestal being formed with an inwardly extending cavity in one wall thereof for supporting a power driven appliance, and a gear unit removably mounted within said hollow pedestal, said gear unit having a power receiving connection accessible through the front wall of said pedestal and facing said flat base for detachable driving connection with the power take-off connection of a power unit supported on said base and a power take-off connection accessible within said cavity for detachable driving connection with the power shaft of an appliance supported from said pedestal.

15. A power stand according to claim 14 in which said base is provided with a clamp to clamp a power unit to said base.

References Cited in the file of this patent

UNITED STATES PATENTS

| | | |
|---|---|---|
| 1,331,139 | Barnes | Feb. 17, 1920 |
| 1,585,725 | Lauterbur | May 25, 1926 |
| 1,720,455 | Stimpson | July 9, 1929 |
| 1,891,925 | Hackett | Dec. 27, 1932 |
| 2,028,282 | Hoe | Jan. 21, 1936 |
| 2,074,708 | Smith | Mar. 28, 1937 |